(12) United States Patent
Ghahary

(10) Patent No.: US 6,548,157 B2
(45) Date of Patent: Apr. 15, 2003

(54) STONE-LIKE LAMINATES

(75) Inventor: Akbar Ghahary, Ringwood, NJ (US)

(73) Assignee: Safas Corporation, Clifton, NJ (US)

( * ) Notice: Subject to any disclaimer, the term of this patent is extended or adjusted under 35 U.S.C. 154(b) by 169 days.

(21) Appl. No.: 09/754,583

(22) Filed: Jan. 4, 2001

(65) Prior Publication Data

US 2002/0086140 A1 Jul. 4, 2002

(51) Int. Cl.[7] .............................. B32B 27/00; C09D 5/29
(52) U.S. Cl. .............................. 428/319.3; 428/319.7; 428/314.4; 523/171; 524/437; 524/560
(58) Field of Search ........................... 428/314.4, 319.3, 428/319.7; 524/437, 560; 523/171

(56) References Cited

U.S. PATENT DOCUMENTS

| 4,060,439 | A | 11/1977 | Rosemund et al. |
| 4,085,246 | A | 4/1978 | Buser et al. |
| 4,707,396 | A | 11/1987 | Wank et al. |
| 4,784,904 | A | 11/1988 | Wood et al. |
| 4,938,825 | A | * 7/1990 | MacDonald ................ 156/245 |
| 4,956,227 | A | 9/1990 | Hirayama et al. |
| 5,043,377 | A | 8/1991 | Nogi et al. |
| 5,304,592 | A | 4/1994 | Ghahary |
| 5,504,126 | A | 4/1996 | Ghahary |
| 5,527,602 | A | 6/1996 | Eisen |
| 5,648,149 | A | 7/1997 | Rukavina et al. |
| 5,688,602 | A | 11/1997 | Ghahary |
| 5,695,870 | A | 12/1997 | Kelch et al. |
| 6,004,663 | A | 12/1999 | Swarts |
| 6,139,945 | A | 10/2000 | Krejchi et al. |
| 6,180,209 | B1 | 1/2001 | Sato et al. |
| 6,093,481 | A1 | 7/2001 | Lynn et al. |
| 6,276,104 | B1 | 8/2001 | Long et al. |

* cited by examiner

Primary Examiner—Terrel Morris
Assistant Examiner—Hai Vo

(57) ABSTRACT

The present invention provides a three layer laminate of (i) an outer layer comprising a filled crosslinked polyester layer, which has a stone-like appearance, (ii) an intermediate layer comprising a crosslinked acrylic resin and (iii) an inner layer comprising a rigid polyurethane foam backing.

10 Claims, No Drawings

STONE-LIKE LAMINATES

BACKGROUND OF THE INVENTION

The present invention relates to plastic laminates with stone-like surfaces that find utility in home and office construction in such applications as countertops, sinks, vanities, shower pan and wall panels, office tables and furniture and wall dividers. The laminates of the present invention can also be used as exterior panels in building construction generally. The laminates of the present invention can be made to have the appearance of granite, marble or other types of stone surfaces and exhibit superior hardness, excellent cushioning and impact strength, high structural strength, high adhesive strength and high dimensional stability when compared to other synthetic stone-like products.

U.S. Pat. No. 5,476,895 discloses sprayable granite-like coating compositions comprising a polyester matrix resin, which contains a particulate crosslinked resin containing an inorganic filler and an additive, which equalizes the density of the particles to that of the matrix, distributed throughout the matrix. The particles are immiscible and visually differentiable and to large measure provide the granite-like appearance of the outer layer.

Normally the sprayable granite-like coating compositions of U.S. Pat. No. 5,476,895 are backed by wood, particle or fiber board, high filler polyester compositions or fiberglass reinforced polyester or epoxy supports. All of these supports have disadvantages including lack of moisture stability, low impact resistance heavy weights or require long curing times. The present invention provides a granite-like laminate with a strong support, which is both moisture resistant and light in weight and can be produced in a very short time by in situ procedures. Additionally the process of the present invention allows for controlled flexibility where such is desired in the end use application.

SUMMARY OF THE INVENTION

The present invention comprises a three layer laminate of an outer layer comprising a filled crosslinked polyester layer, an intermediate layer comprising a crosslinked acrylic resin and an inner layer comprising a polyurethane foam layer. More specifically the present invention relates to laminates in which the outer layer is a polyester resin, which is crosslinked with styrene the intermediate acrylic resin layer is based on an alkyl methacrylate or acrylate resin and the polyurethane inner layer is based on a polyol/isocyanate combination. The laminate is obtained by sequentially forming the layers starting with the filled polyester layer, which can be sprayed or otherwise coated onto the mold surface, which is then gelled but not totally cured. If the granite-like coating is fully cured, it will be apart from the mold surface or broken by pressure in injection process. The gelled polyester layer with filler is followed by the application of the acrylic resin, which is totally cured before the third layer the polyurethane is applied and cured, otherwise the uncured acrylic resin or monomer will effect the reaction of polyol/isocyanate and lose or reduce adhesion between the acrylic layer and the polyurethane layer. In a molding system, the first two layers are applied and reacted in the same way, the mold is then closed and the polyurethane is poured or injected into the mold.

The resulting cured laminates provide rigid products that do not require further physical supports in their applications. The rigidity of the laminate can be controlled by the type and degree of crosslinking in the polyurethane. Thus in certain application it may be desirable to provide flexibility to the laminate which can be accomplished by employing flexible polyurethane. The present invention therefore also provides for a greater range of applications as compared to the laminates of the art.

DETAILED DESCRIPTION OF THE INVENTION

The present invention provides laminates that have a stone-like appearance and also exhibit a rigidity equivalent to that of granite, but do not have the weight of actual stone. These properties are obtained by combining a layer of material that provides for a stone-like surface with a material that provides high rigidity and stiffness at low weight levels such as rigid polyurethane foam.

The stone-like outer layer is generally a crosslinked unsaturated polyester resin in which the crosslinking is achieved by copolymerization with an aromatic monomer which generally is styrene or at least contains styrene and which contains in addition to some inorganic filler, granules which themselves are crosslinked resin containing inorganic fillers and which have the same density as the matrix resin. The granules can be made from polyester resins, epoxy resins or acrylic resins although polyester resins are preferred. The granules can also be made from filled and unfilled thermoplastics such as PET, PBT, ABS, PC and any other thermoplastic resins. However, the granules made from thermoplastic resin is not same as thermosetting resin based granules which have good thermal stability, chemical resistance, stain resistance, hardness and weathering resistance. The filler in the granules can be inorganic oxide or mineral but is preferably aluminum trihydrate (ATH) because it give excellent flame resistance. In order to achieve the same or at least similar density as the matrix resin an air-encapsulated material in particulate form is generally added. Such air-encapsulated materials are preferably microspheres such as glass microspheres. Comminuted closed cell foams are another additive to equalize the density of the granules and the matrix.

The preferred polyester resins are known in the trade as gel coat resins. Unsaturated polyester resins used for granite-like surfaces are commercially available under the trademark "Granicoat" and are claimed in U.S. Pat. No. 5,476,895. The filled polyester layer should be employed in sufficient amounts to form a continuous layer that provides the appearance of granite. In general the granite-like material is employed in a thickness of 5 to 70 mil.

The filler components of the unsaturated polyester matrix resin can vary and depend to a large measure on the physical appearance of the surface desired. Thus the resin may contain filler, pigment or metal particles, antioxidants, and UV-light stabilizers in addition to the thermoset/thermoplastic granules disclosed in the art. In general the unsaturated polyester resin for laminates with granite-like surfaces contains from 10 to 60% of such granules. The preferred polyester resins are known in the art as gel coat resins and primarily involve resins obtained by the condensation of isophthalic acid and neopentyl glycol to which unsaturated polyols are added to provide sites for crosslinking by polymerization with vinyl monomers. However other aromatic acids and other polyols can also be employed as well as mixtures of polyols and acids.

Since room temperature curing is too time-consuming it is generally preferred to employ elevated temperatures and catalysts which allow for faster curing of the polyester layer.

Mold temperatures up to 150° F. can be employed. Additionally catalysts such as Perkadox 16 may be added to the unsaturated polyester matrix to accelerate the curing when exothermic heat is produced during the curing of the acrylic layer or the polyurethane layer.

Because the unsaturated polyester resin is combined with the polyurethane before complete polymerization of the crosslinking vinyl monomer and because such monomer affects the structure, dimensional stability and rigidity of the polyurethane foam, it is essential to provide a barrier layer. Acrylic resins cure very rapidly and once cured provide a barrier layer that prevents any vinyl monomer in the unsaturated polyester from transferring into the polyurethane as it is applied to the laminate. Also, the cured acrylic barrier layer has good adhesion to the polyurethane foam. The acrylic resins that can be applied include polymers derived by the polymerization of acrylic vinyl monomers such as methyl methacrylate, ethyl acrylate, butyl acrylate and ethyl methacrylate and a polyvinyl monomer such as glycidyl methacrylate, triethylene glycol dimethacrylate, 1,4-butanediol dimethacrylate, 1,6-hexanediol dimethacrylate and trimethylolpropane trimethacrylate. The acrylic resin is normally applied as a mixture of prepolymerized acrylic resin in additional acrylic monomer. Sufficient of the polyvalent monomer is employed a to assure a rapid crosslinking of the acrylic resin composition. In general the polyvinyl acrylic monomer is employed in a concentration of 1–3 weight %. The acrylic resin may also contain filler to make it more compatible with the polyester topcoat.In general sufficient acrylic resin is employed to provide a coating of 5 to 20 mils although such is not critical as long as a properly cured continuous barrier layer is formed.

Rigid polyurethanes suitable in the present invention are generally obtained by the reaction of polyisocyanates with polyols. The formation of such rigid polyurethane foams is well known in the art and a wide variety of polyurethane components can be employed to form the foamed layer in the laminates of the present invention. In general the reaction components comprise a polyether or polyester polyol or combinations thereof which are commercially available and are sold for the purpose of forming rigid polyurethane foams. Isocyanates suitable for the formation of rigid polyurethane foams are similarly commercially available and sold for that purpose. Suitable isocyanates include 4,4'diphenylmethane diisocyanate, toluyl diisocyanate and prepolymers of polyols and excess diisocyanates. Blowing agents for rigid polyurethanes can be in situ formed carbon dioxide but preferably is a halogenated blowing agent such as dichlorofluoroethane or trichlorofluoromethane.

The density and rigidity of the polyurethane layer can be adjusted to optimize the use of the laminate for any given application, by the amount of blowing agent that is employed and by the addition of fillers as the components are mixed. The fillers employed for the polyurethane are normally inorganic oxides or minerals such as barium sulfate, which can adjust the weight of foam, and mica, which can give good reinforcement.

The rate of curing of the rigid polyurethane foam is controlled by the curing temperature and the type and concentration of catalyst employed. Catalysts employed for the curing of the polyurethane are well known in the art and can be employed in the formation of the polyurethane foam layer in accordance with such teachings.

The polyurethane foam can be employed to whatever thickness is optimum for the application desired. Thus for paneling it may be desirable to have a relatively thin coating such as 50 mil. In other applications, particularly when a closed mold is employed, the polyurethane can be used to fill the entire mold after the application of the polyester and acrylic resin layers.

The invention is further illustrated by the following example.

EXAMPLE

A fiberglass reinforced polyester and epoxy mold with a compressed air hook is coated with a high temperature silicone release wax. The mold is then heated to a temperature between 100 and 150° F. An elevated temperature fast curing unsaturated polyester resin was sprayed on the mold surface. The unsaturated polyester is an unsaturated isophthalic acid/neopentyl glycol resin available commercially from Reichhold Chemical as Polylite ISO/NPG 32168 containing styrene as the crosslinking monomer that had been blended with 30% of comminuted crosslinked polyester containing aluminum trihydrate, pigment and glass microspheres prepared as described in U.S. Pat. No. 5,476,895. The catalyst employed for high temperature applications is 0.35% Perkadox 16. The polyester was sprayed to a thickness of approximately 25 mil. The resin becomes gelled but not totally cured within about 3 to 4 minutes, at which point the intermediate acrylic resin layer was sprayed onto the gelled polyester.

The liquid acrylic resin composition containing 50% poly(methyl methacrylate), 25% methacrylate monomer, 1% of triethylene glycol dimethacrylate, 25% of ATH, and 1% of fumed silica and the resin was applied while the mold was still being maintained at a temperature of from 100–150° F. The polymerization initiator package for the acrylic resin contained, based on resin solution, 0.75% benzoyl peroxide, 0.25% Perkadox 16, a commercially available peroxydicarbonate, 0.1% dimethylaniline and 0.1% of dimethyl-p-toluidine. The acrylic resin composition was sprayed to a thickness of 5–10 mil and cured within 3–5 minutes.

The rigid polyurethane foam layer is formed from commercially available components comprising for the isocyanate component a mixture of 4.4'-diphenylmethane diisocyanate (MDI) and a polymer of MDI and for the polyol component a blend of UTC 6066 available from the Urethane Technology Company and Multranol 4011/4012 available from the Bayer Corp. The blend applied to the cured acrylic resin contained 25% of the isocyanate and 35% of the polyol component and in addition contained 40% of ATH and approximately 0.5% of dichlorofluoroethane as the blowing agent. The additive package blended with the urethane composition included commercially available catalysts such as DABCO DMEA from Air Products, COSCAT 83 from Cosan Chemical, modifiers such as Curithane 52 and a silicone surfactant. Curing of both the polyester layer and the rigid polyurethane foam is continued until no further reaction, which usually occurs within a period of less than 30 minutes at the elevated mold temperatures employed.

The resulting laminate has the appearance of granite and has the surface properties equivalent to commercial products and a rigidity that is equal to that of a polyester granite-like coating on a hardboard.

Other types of stone surfaces can be accomplished with the laminates of the present invention by varying the size, color and nature of the granules or other additives added to the polyester resin matrix.

It should be understood that the laminates can be equally formed with flexible polyurethane foam and polyurethane elastomers using known polyurethane compositions and manufacturing methods.

What is claimed is:

1. A three layer laminate comprising (i) a layer of cured isophthalic acid, neopentyl glycol polyester resin containing granules of an immisicible filled thermoset resin visually differentiable from the polyester resin and having substantially the same density as the polyester resin, (ii) an intermediate layer of cured, crosslinked acrylic resin and (iii) a layer of polyurethane foam resin, wherein the polyester resin layer and the foamed polyurethane layer are polymerized in the presence of the cured acrylic resin.

2. The laminate of claim 1 wherein the polyester resin is a gel coat base resin.

3. The laminate of claim 1 wherein the acrylic resin is a methacrylate based resin.

4. The laminate of claim 1 wherein the polyurethane foam is a rigid polyurethane foam.

5. The laminate of claim 1 wherein the polyurethane foam is a crosslinked resin obtained by the reaction of an isocyanate with a polyol.

6. The laminate of claim 1 having a granite-like polyester resin surface.

7. An article selected from the class consisting of wall panels, vanities, kitchen counters, shower cabinets, sinks table tops and furniture parts made from the laminates of claim 1.

8. A three layer laminate comprising (i) a layer of a cured, crosslinked isophthalic acid-neopentyl glycol polyester having dispersed therein granules of the same cured polyester resin, said granules containing an inorganic filler and being visually differentiable from the matrix polyester and being substantially immiscible, (ii) an intermediate layer of a crosslinked methacrylate resin, and (iii) a rigid polyurethane foam layer based on isocyanate and polyol reaction.

9. A method of forming a laminate which comprises spraying an unsaturated isophthalic acid, neopentyl glycol polyester resin containing a vinyl aromatic monomer and granules of an immisicible filled thermoset resin visually differentiable from the polyester resin and having substantially the same density as the polyester resin onto a mold surface, initiating and partially crosslinking the polyester resin;

spraying an intermediate layer comprising a crosslinkable acrylic resin onto the surface of the polyester resin and fully curing the acrylic resin; and applying a polyurethane composition to the surface of the acrylic coating and forming the polyurethane composition into a rigid polyurethane foam;

wherein the polyester resin layer and the foamed polyurethane layer are polymerized in the presence of the cured acrylic resin.

10. The method of claim 9 wherein the polyester resin is a gel coat base resin containing styrene as the crosslinking monomer.

* * * * *